(12) United States Patent
Zaitsev et al.

(10) Patent No.: US 10,049,092 B2
(45) Date of Patent: Aug. 14, 2018

(54) TEXT ALTERATIONS BASED ON BODY PART(S) USED TO PROVIDE INPUT

(71) Applicant: Lenovo (Singapore) Pte. Ltd., New Tech Park (SG)

(72) Inventors: Grigori Zaitsev, Durham, NC (US); Russell Speight VanBlon, Raleigh, NC (US); Jianbang Zhang, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 121 days.

(21) Appl. No.: 15/010,598

(22) Filed: Jan. 29, 2016

(65) Prior Publication Data
US 2017/0220534 A1   Aug. 3, 2017

(51) Int. Cl.
G06F 17/24 (2006.01)
G06F 3/0488 (2013.01)
G06F 3/0482 (2013.01)
G06F 17/22 (2006.01)

(52) U.S. Cl.
CPC ............ *G06F 17/24* (2013.01); *G06F 3/0482* (2013.01); *G06F 3/04886* (2013.01); *G06F 17/2235* (2013.01)

(58) Field of Classification Search
CPC ..... G06F 17/24; G06F 3/0482; G06F 3/04886
USPC ........................................................ 715/256
See application file for complete search history.

(56) References Cited

U.S. PATENT DOCUMENTS

| 8,423,351 | B2 * | 4/2013 | Hughes | G06F 3/0237 704/1 |
| 2010/0149114 | A1 * | 6/2010 | Li | G06F 3/0416 345/173 |
| 2013/0201155 | A1 * | 8/2013 | Wu | G06F 3/03547 345/174 |

OTHER PUBLICATIONS

"ContextType: Using Hand Posture Information to Improve Mobile Touch Screen Text Entry"; pp. 2795-2798; Mayank Goel et al; 2013; CHI 2013: Changing Perspectives.*
"GripSense: Using Built-in Sensors to Detect Hand Posture and Pressure on Commodity Mobile Phones"; pp. 545-554; Mayank Goel et al; Copyright 2012 ACM.*

* cited by examiner

*Primary Examiner* — Stephen S Hong
*Assistant Examiner* — Broderick C Anderson
(74) *Attorney, Agent, or Firm* — John L. Rogitz; John M. Rogitz

(57) ABSTRACT

In one aspect, a device includes a processor, a touch-enabled display accessible to the processor, and storage accessible to the processor. The storage bears instructions executable by the processor to determine a number of body parts with which a user provides input to the device and to perform a text alteration based at least in part on the determination of the number of body parts.

20 Claims, 12 Drawing Sheets

TEXT ALTERATIONS BASED ON BODY PART(S) USED TO PROVIDE INPUT

FIELD

The present application relates generally to text alteration that are performed based on one or plural body parts being used to provide input of text.

BACKGROUND

As recognized herein, a user may sometimes provide unintended or erroneous text input to a device, such as a typographical error. As also recognized herein, a change to the text may then be automatically made by the device to fix the typographical error, but an appropriate change may vary based on various factors and there are currently no adequate solutions for accounting for such factors.

SUMMARY

Accordingly, in one aspect a device includes a processor, a touch-enabled display accessible to the processor, and storage accessible to the processor. The storage bears instructions executable by the processor to determine a number of body parts with which a user provides input to the device and to perform a text alteration based at least in part on the determination of the number of body parts.

In another aspect, a method includes determining one or more body parts with which a user touches a display and executing a text correction based at least in part on the determination.

In still another aspect, an apparatus includes a first processor, a network adapter, and storage bearing instructions executable by a second processor for determining a typing style with which a user provides input to a touch-enabled display accessible to the second processor and performing a text alteration based at least in part on the determination of the typing style. The first processor transfers the instructions to the second processor over a network via the network adapter.

The details of present principles, both as to their structure and operation, can best be understood in reference to the accompanying drawings, in which like reference numerals refer to like parts, and in which:

DETAILED DESCRIPTION

Figure 1:
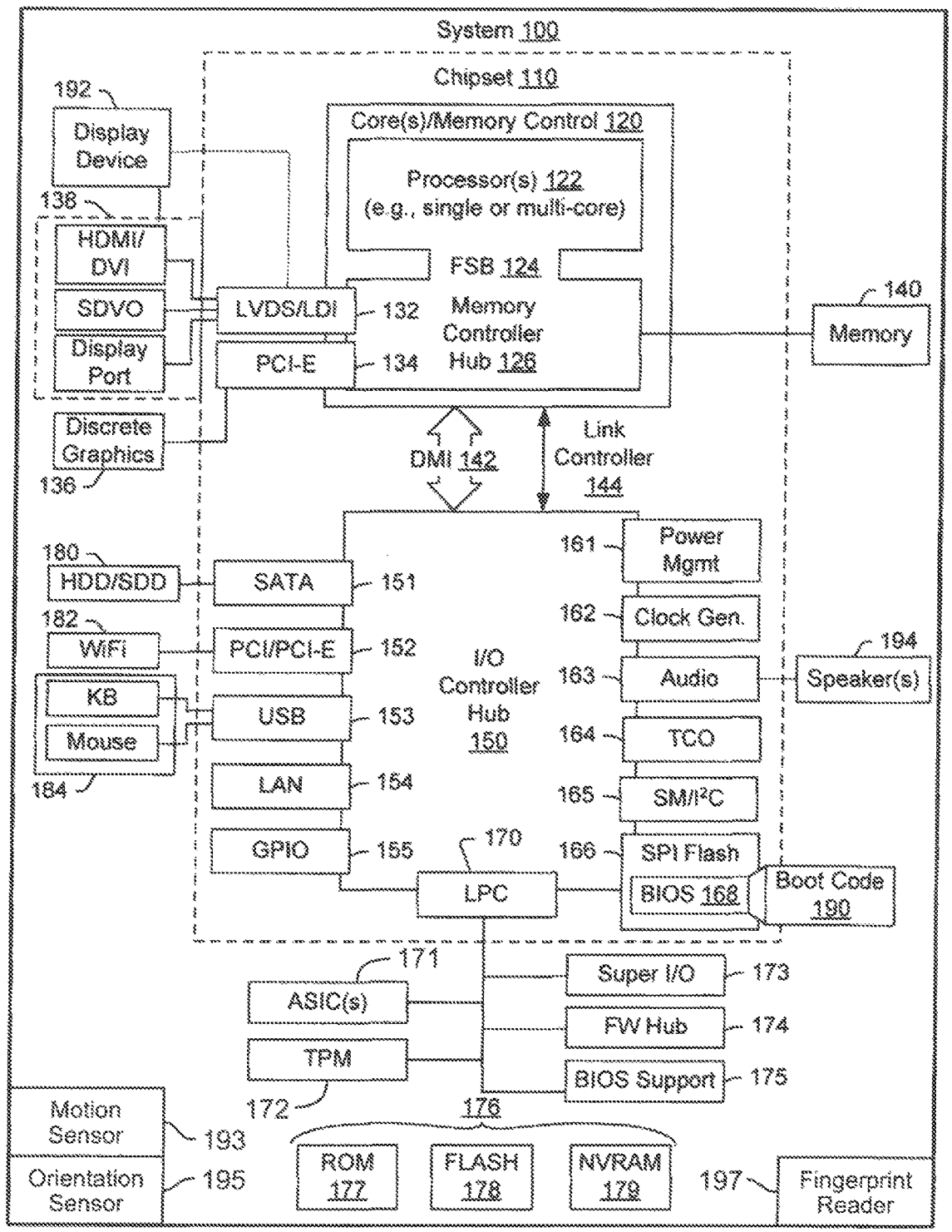
FIG. 1 is a block diagram of an example system in accordance with present principles.

With respect to any computer systems discussed herein, a system may include server and client components, connected over a network such that data may be exchanged between the client and server components. The client components may include one or more computing devices including televisions smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, Microsoft. A Unix or similar such as Linux operating system may be used. These operating systems can execute, one or more browsers such as a browser made by Microsoft or Google or Mozilla or other browser program that can access web applications, hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data link and control lines and registers and shift registers. Moreover, any logical blocks, modules, and circuits described herein can be implemented or performed, in addition to a general purpose processor, or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by, e.g., a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that is not a transitory signal) such as a random access memory (RAM) read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

The term "circuit" or "circuitry" may be used in the summary, description, and/or claims. As is well known in the art, the term "circuitry" includes all levels of available integration, e.g., from discrete logic circuits to the highest level of circuit integration such as VLSI, includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX® or Playstation®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipset are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., CRT, a flat panel, a projector, a touch-enabled display, etc.) A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include ASP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Still in reference to FIG. 1, the system 100 may also include a motion sensor 193, such as an accelerometer, that senses acceleration and/or movement of the system 100 and provides input related thereto to the processor 122, as well as an orientation sensor 195, such as a gyroscope, that senses and/or measures the orientation of the system 100 and provides input related thereto to the processor 122.

Still farther, the system 100 may include a fingerprint reader and/or sensor 197. The fingerprint reader 197 may be used to gather data pertaining to and/or images of the fingerprint of a user. In some embodiments, the fingerprint reader 197 may be e.g. an optical fingerprint reader.

Additionally, though now shown for clarity, in some embodiments the system 100 may include an audio receiver/ microphone that provides input to the processor 122 based on audio that is detected, such as via a user providing audible input to the microphone, and a camera that gathers one or more images and provides input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video. Still further, and also not shown for clarity, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
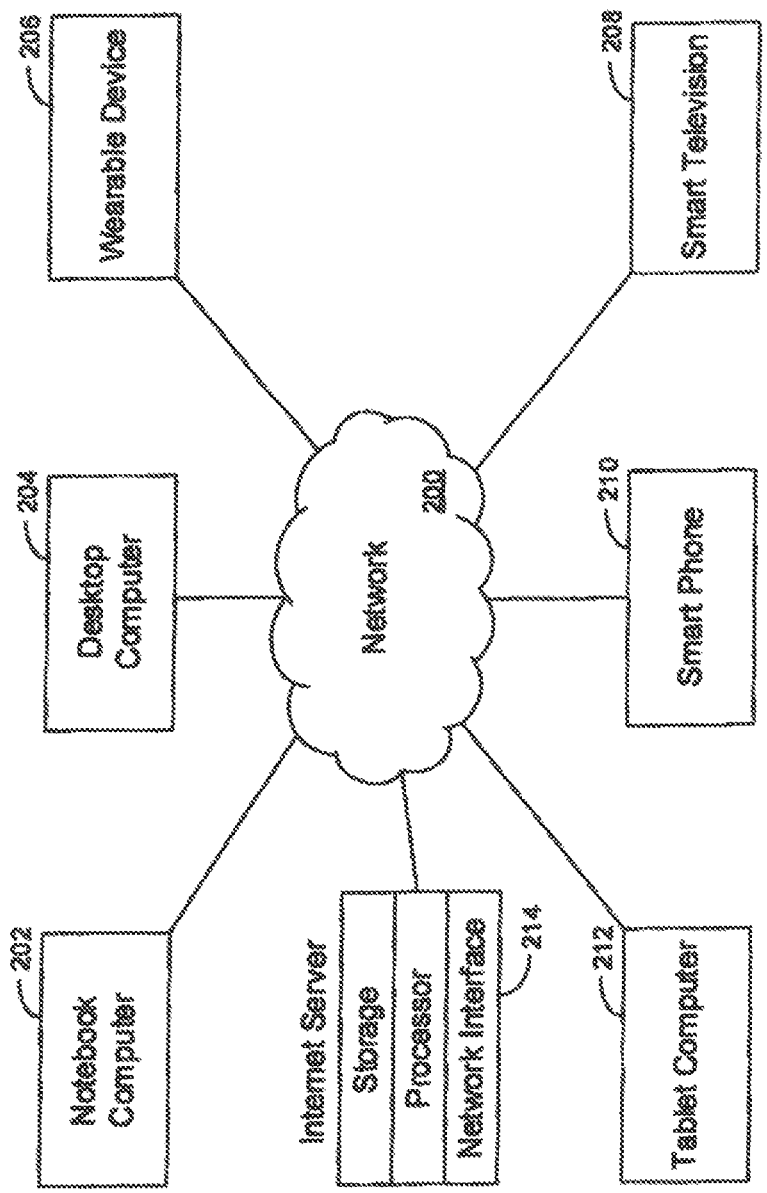
FIG. 2 is a block diagram of a network of devices in accordance with present principles.

Turning now to FIG. 2, example devices are shown communicating over a network 200 such as the Internet in accordance with present principles. It is to be understood that each or the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
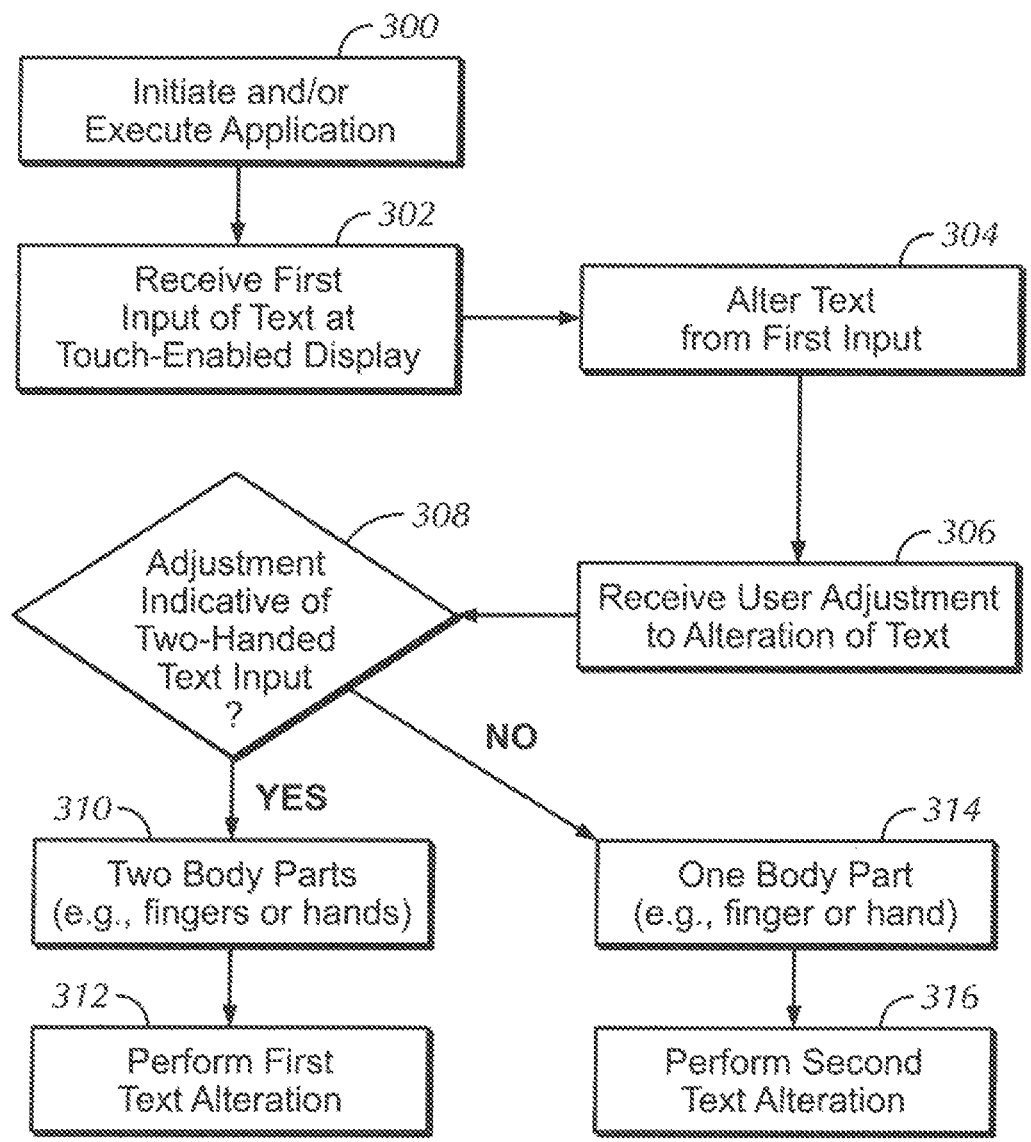
FIGS. 3-10 are flow charts of example algorithms in accordance with present principles.

Referring to FIG. 3, it shows example logic that may be executed by a device such as the system 100 in accordance with present principles (referred to below when describing FIG. 3 as the "present device") to determine whether a user is using one or two body parts to provide typing input to the present device (e.g., which may establish respective typing styles, along with which specific fingers/thumbs are being used) and hence whether to perform various text alterations and/or corrections based on that. Beginning at block 300, the logic initiates and/or executes one or more applications for undertaking present principles, such text messaging application, an email application, a touch input processing application etc. From block 300 the logic then proceeds to block 302 where the logic receives first input from a user that is directed to one or more keys of a keyboard presented on a display controllable by the present device.

From block 302 the logic of FIG. 3 proceeds to block 304. At block 304 the logic determines whether an alteration or correction to a text sequence entered by the user as received at block 302 should be made, and if the logic determines that one should be made, the text sequence is altered (e.g., as represented on the touch-enabled, display) at block 304. The logic next moves to block 306, where the logic receives user input to adjust the altered text sequence from how the logic altered it to a different alteration that is itself different from the text sequence as originally input by the user. For example, at block 304 the logic may have not only altered a text sequence but also, responsive to altering the text sequence, presented (on the touch-enabled display) one or more alternative, selectable options for alterations to the text sequence other than the one made by the logic at block 304.

A user may select one of these options, which in this example would at least in part establish the user input received at block 306. Examples of such options will be discussed below in reference to FIG. 11.

In any case, still in reference to FIG. 3, from block 306 the logic next moves to decision diamond 308. At diamond 308 the logic determines whether the adjustment from the user as identified based on the input received at block 306 is indicative of two-handed text input (as opposed to, for instance, one handed text input). For example, if the user provided input of the text sequence "seh", the logic altered the text to "she", and subsequently to that the user altered the text to "seg", the logic may determine that the user's error was one of selecting an adjacent key to an intended key (in this case, selection of the "h" key on a QWERTY keyboard instead of the intended "g" key when attempting to enter the word "segment") rather than an error in selecting two intended keys but out of an intended sequence. This may be determined by the logic to be indicative of the user using one hand or finger to provide the input, whereas based on a user's selection of a text alteration that is recognized by the logic as being indicative of an error in sequence in which intended characters were selected by the user (such as may be the case if the user was typing the word "she" relatively fast and erroneously selected the "e" and "h" keys out of sequence), the logic may determine that such is indicative of the user using two hands or fingers to provide the input.

Still in reference to diamond 308, note that responsive to an affirmative determination thereat the logic proceeds to block 310. At block 310 the logic concludes that two body parts (e.g., two different fingers, or two different hands) were used to provide the input received at block 302, and then moves to block 312 where the logic performs a subsequent text alteration (e.g., at a later time, in response to additional user input) based on the user using two body parts to select keys of the keyboard (such as performing another text alteration correcting an error in character selection sequence).

However, if at diamond 308 the logic makes a negative determination thereat, the logic instead moves to block 314. At block 314 the logic concludes that one body part was used to provide the input received at block 302, and then moves to block 316 where the logic performs a subsequent text alteration based on the user using one body part to select keys of the keyboard (such as performing another text alteration correcting an error particular key selection).

Figure 4:
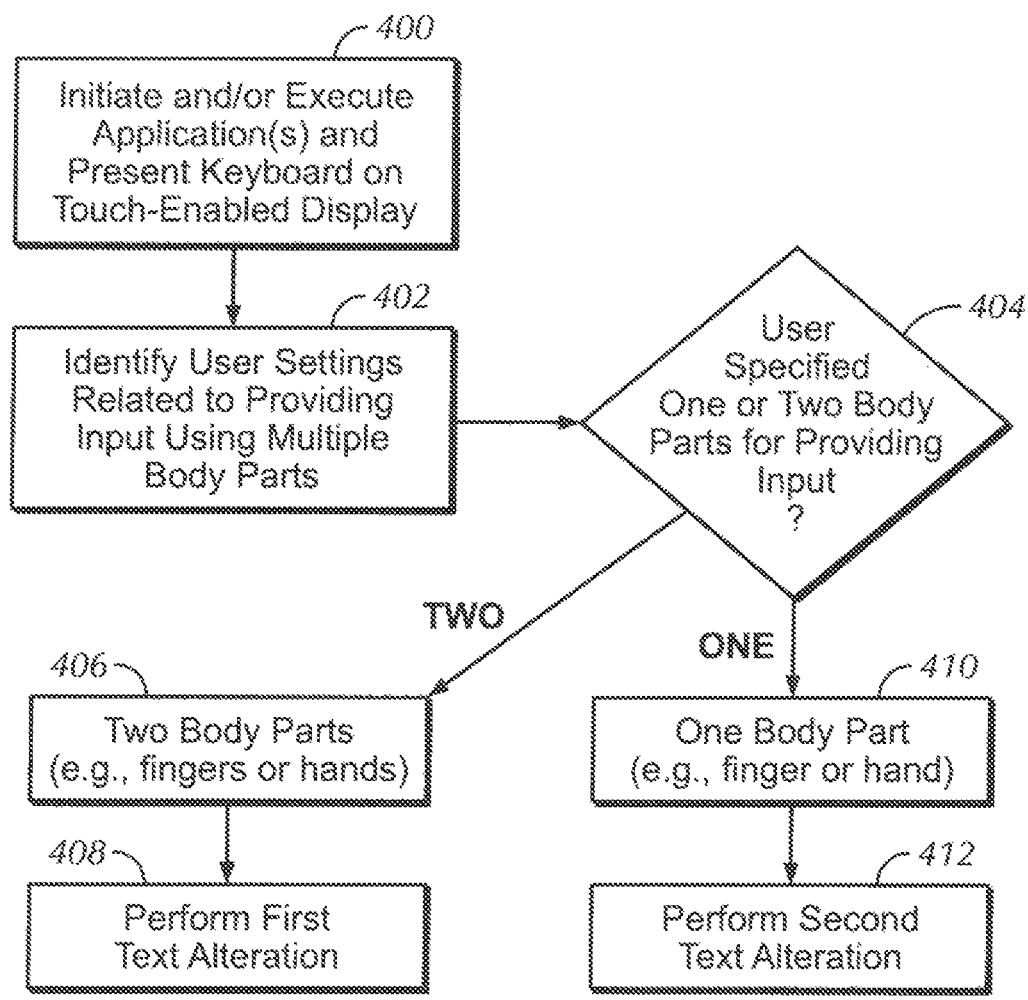

Continuing now in reference to FIG. 4, it also shows example logic that may be executed by a device such as the system 100 in accordance with present principles (referred to below when describing FIG. 4 as the "present device") to determine whether a user is using one or two body parts provide typing input to the present device and hence whether to perform various text alterations and/or corrections based on that. Beginning at block 400, the logic initiates and/or executes one or more applications for undertaking present principles, such as a text messaging application, an email application, a touch input processing application etc. From block 400 the logic then proceeds to block 402 where the logic may first identify a user of the present device (e.g., based on a particular user being associated with the present device, based on identification of a fingerprint of the user detected when the user previously selected a key or other selector presented on a touch-enabled display of the present device, etc.). Also at block 402, the logic may identify one or more settings previously configured by the identified user (e.g., based of data related to configured settings that is accessible to the present device) that are related to whether the user will provide input using one body part or plural body parts.

From block 402 the logic next proceeds to decision diamond 404. At diamond 404 the logic determines based on the identified setting(s) whether the user specified that he or she will provide input using one body part or plural body parts. Responsive to determining at diamond 404 that the user specified that he or she will provide input using plural body parts, the logic moves to block 406 where the logic concludes that plural body parts are or will be used to select keys of a keyboard, and then moves to block 408 where the logic performs a subsequent text alteration based on the user using plural body parts to select keys of the keyboard.

However, responsive to determining at diamond 404 that the user specified that he or she will provide input using one body part, the instead logic moves to block 410 where the logic concludes that one body part is or will be used to select keys of the keyboard, and then moves to block 412 where the logic performs a subsequent text alteration based on the user using one body part to select keys of the keyboard.

Figure 5:
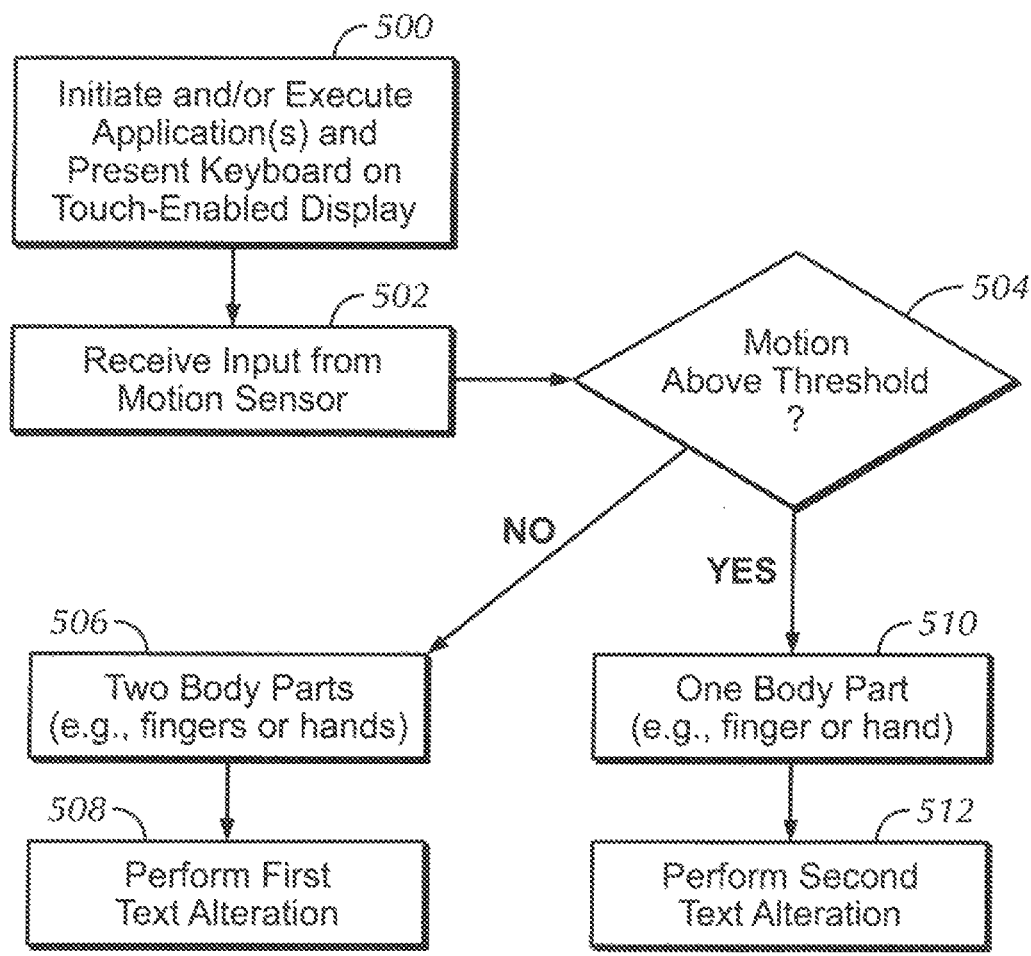

Now in reference to FIG. 5, it too shows example logic that may be executed by a device such as the system 100 in accordance with present principles (referred to below when describing FIG. 5 as the "present device") to determine whether a user is using one or two body parts to provide typing input to the present device and hence whether to perform various text alterations and/or corrections based on that. Beginning at block 500, the logic initiates and/or executes one or more applications for undertaking present principles, such as a text messaging application, an email application, a touch input processing application, etc. From block 500 the logic then proceeds to block 502 where the logic receives input from a motion sensor in communication will and/or coupled to the present device. In example embodiments, the motion sensor may be an accelerometer or an inertial sensor. In any case, from block 502 the logic next proceeds to decision diamond 504.

At diamond 504 the logic determines whether the input received at block 502 is indicative of motion above a motion threshold. Responsive to determining at diamond 504 that motion is not above the threshold, the logic proceeds to block 506 where the logic concludes that at least two body parts are or will be used to select keys if a keyboard, and then moves to block 508 where the logic performs a subsequent text alteration based on the user using two body parts to select keys of the keyboard. Responsive to determining at diamond 504 that motion is above the threshold, the logic instead proceeds to block 510 where the logic concludes that one body part is or will be used to select keys of a keyboard, and then moves to block 512 where the logic performs a subsequent text alteration based on the user using one body part to select keys of the keyboard. As a brief example, an affirmative determination at diamond 504 may be made if a user holds the present device with only one hand and uses only one finger on the to select the keys, and hence naturally the present device may undergo relatively more motion (above the threshold) that if it were held relatively more stable using two hands (in which motion of the device may be below the threshold).

Figure 6:
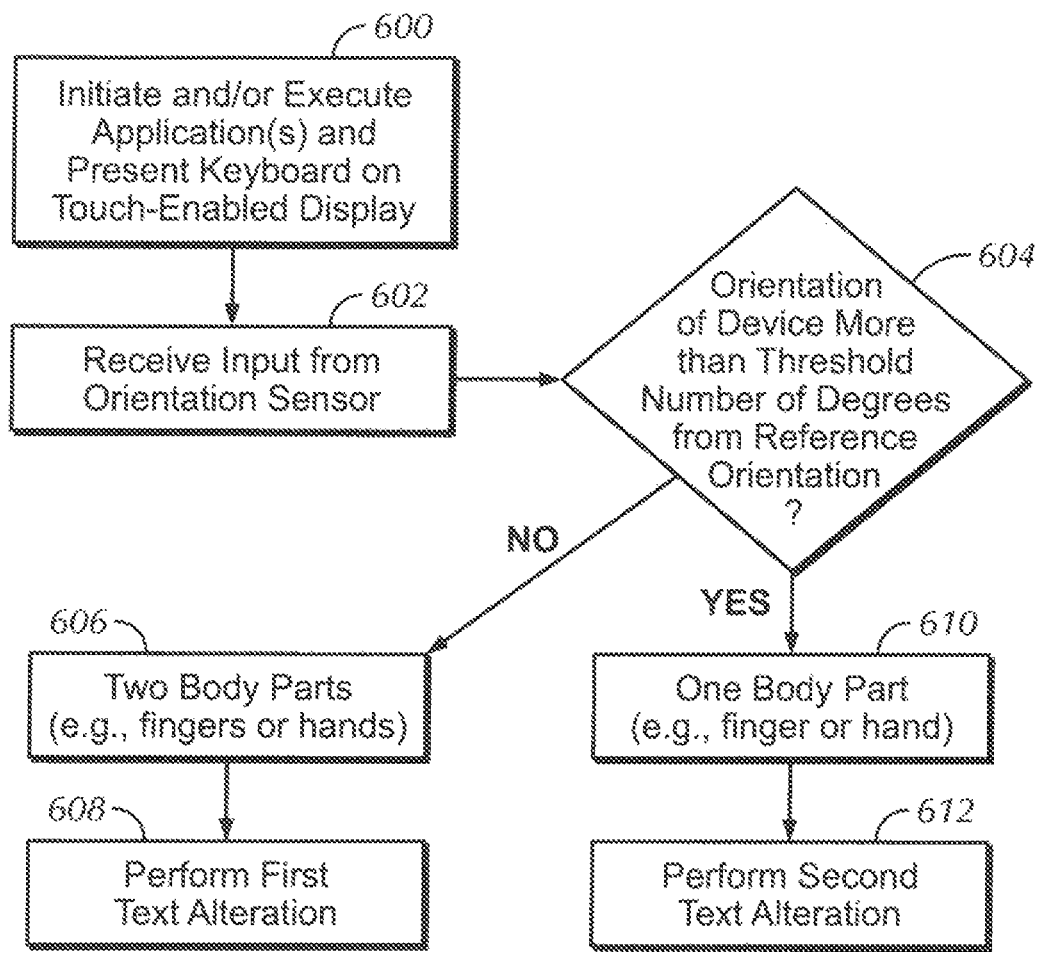

Moving on, FIG. 6 will now be described. It shows example logic that may be executed by a device such as the system 100 in accordance with present principles (referred to below when describing FIG. 6 as the "present device") to determine whether a user is using one or two body parts to provide typing input to the present device and hence whether to perform various text alterations and/or corrections based on that. Beginning at block 600, the logic initiates and or executes one or more applications for undertaking present principles, such as a text messaging application, an email application, a touch input processing application, etc. From block 600 the logic then proceeds to block 602 where the logic receives input from an orientation sensor in communication with and/or coupled to the present device. In example embodiments, the orientation sensor may be a gyroscope or an inertial sensor. In any case, from block 602 the logic next proceeds to decision diamond 604.

At diamond 604 the logic determines whether the input received at block 602 is indicative of an orientation of the present device being more than a threshold number of degrees from a reference orientation. For example, the logic may determine whether an orientation of a plane of an exterior surface of the present device's display relative to earth is more than a threshold number of degrees from a reference plane that has a Y axis at least parallel to a direction of gravity toward earth.

Responsive to determining at diamond 604 that the current orientation is not more than the threshold, the logic proceeds to block 606 where the logic concludes that at least two body parts are or will be used to select keys of a keyboard, and then moves to block 608 where the logic performs a subsequent text alteration based on the user using two body parts to select keys of the keyboard. Responsive to determining at diamond 604 that the current orientation is above the threshold, the logic instead proceeds to block 610 where the logic concludes that one body part is or will be used to select keys of a keyboard, and then moves to block 612 where the logic performs a subsequent text alteration based on the user using one body part to select keys of the keyboard.

As a brief example, an affirmative determination at diamond 604 may be made where a user uses but one hand to hold the present device and provide touch input, and hence may hold the present device so that a plane established by the touch-enabled display is at least substantially orthogonal to a direction of the earth's gravity for the user to support the present device while providing touch input, whereas if the user were holding the device with two hands and typing with both thumbs, the user may hold the present device in an orientation in which a Y axis of the plane of the display is at least substantially parallel to the direction of the earth's gravity while still being able to not drop or lose control of the present device (which may result in a negative determination at diamond 604).

Figure 7:
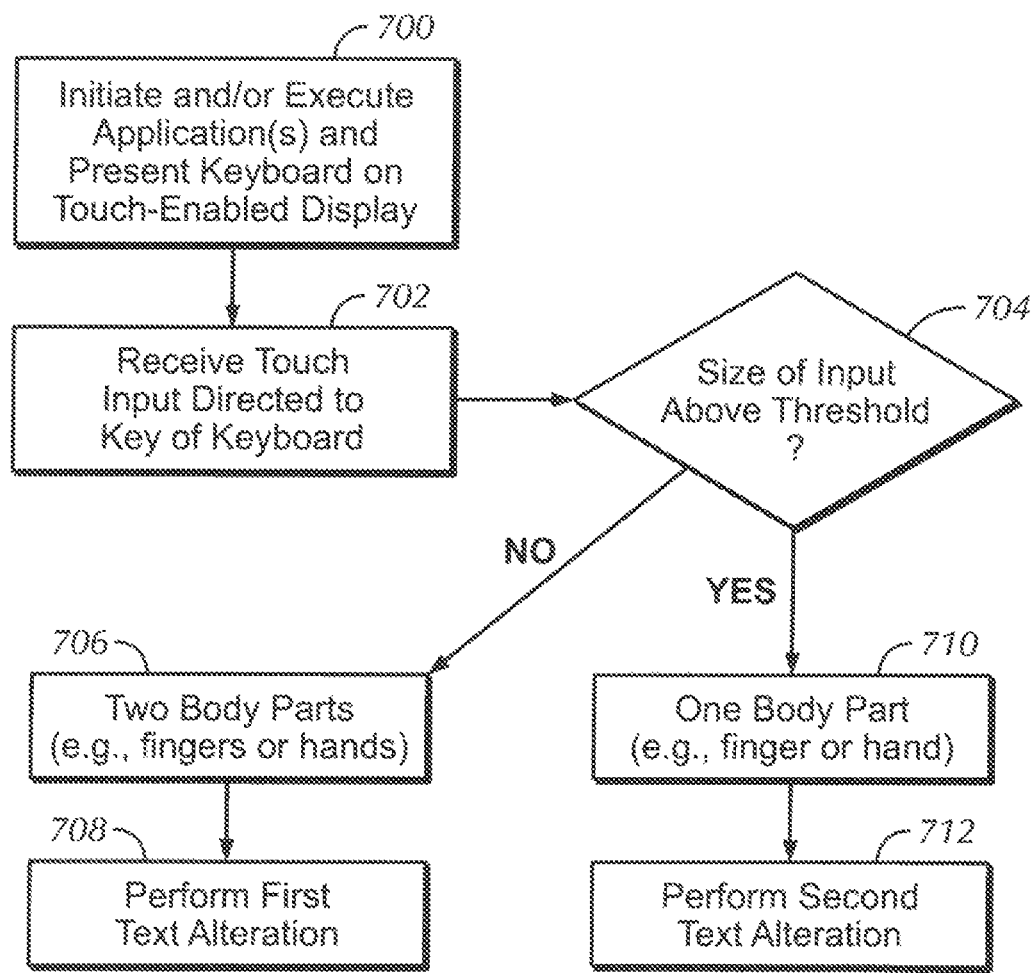

Continuing the detailed description in reference to FIG. 7, it shows yet another example logic that may be executed by a device such as the system 100 in accordance with present principles (referred to below when describing FIG. 7 as the "present device") to determine whether a user is using one or two body parts to provide typing input to the present device and hence whether to perform various text alterations and/or corrections based on that. Beginning at block 700, the logic initiates and/or executes one or more applications for undertaking present principles, such as a text messaging application, an email application, a touch input processing application, etc. From block 700 the logic then proceeds to block 702 where the logic receives touch input from the user directed to a key of a keyboard presented on the present device's display. From block 702 the logic next proceeds to decision diamond 704.

At diamond 704 the logic determines whether a size or area of the input, such as may be determined based on a total area of the display physically touched by the user to provide the touch input received at block 702, is more than a threshold size or area. The logic may identify such an area of the display touched by the user by determining X and Y coordinates of portions of the display that were contacted by the user and then calculating a total area encompassing those portions but not others.

Responsive to determining at diamond 704 that the size/area is not more than the threshold, the logic proceeds to block 706 where the logic concludes that at least two body parts are or will be used to select keys of a keyboard, and then moves to block 708 where the logic performs a subsequent text alteration based on the user using two body parts to select keys of the keyboard. Responsive to determining at diamond 704 that the size/area is above the threshold, the logic instead proceeds to block 710 where the logic concludes that one body part is or will be used to select keys of a keyboard, and then moves to block 712 where the logic performs a subsequent text alteration based on the user using one body part to select keys of the keyboard.

As a brief example, an affirmative determination at diamond 704 may be made where a user holds the present device with only one hand and uses only one finger to select the keys, and hence when reaching for a key not as proximate to the majority of the user's hand as another key, the user's contact area with the display may be greater area than would result from a relatively smaller or more precise finger touch that would occur if the finger were approaching and contacting the display from an angle more orthogonal to a plane established by the display (as may be the case if the user were using two hands to type).

Figure 8:
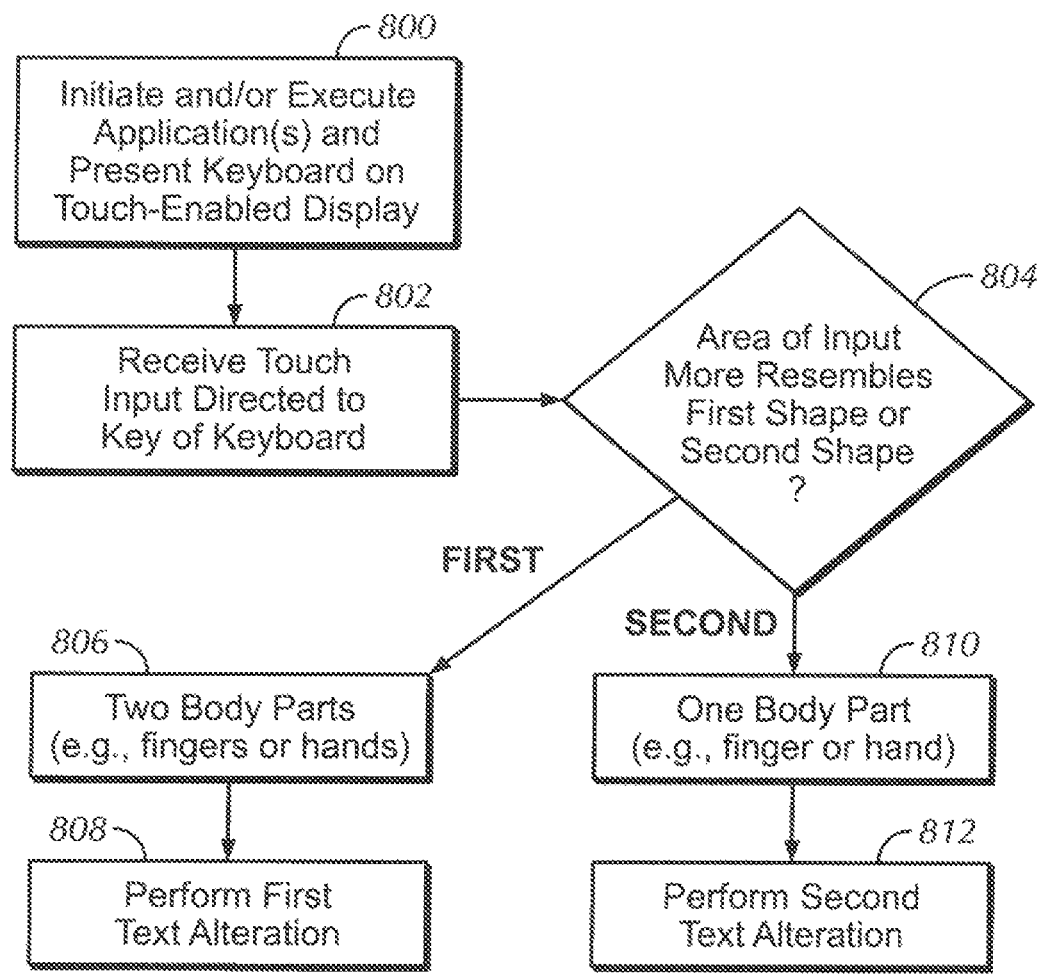

Now describing FIG. 8, it also shows example logic that may be executed by a device such as the system 100 in accordance with present principles (referred to below when describing FIG. 8 as the "present device") to determine whether a user is using one or two body parts to provide typing input to the present device and hence whether to perform various text alterations and/or corrections based on that. Beginning at block 800, the logic initiates and/or executes one or more applications for undertaking present principles, such as a text messaging application, an email application, a touch input processing application, etc. From block 800 the logic then proceeds to block 802 where the logic receives touch input from the user directed to a key of a keyboard presented on the present device's display. From block 802 the logic next proceeds to decision diamond 804.

At diamond 804 the logic determines whether an area of the display contacted by the user to provide the input received at block 802 more conforms to or resembles a first predetermined shape or a second predetermined shape. For example, the logic may identify an actual shape of a touched area of the display by determining X and Y coordinates of portions of the display that were contacted by the user and then calculating a perimeter encompassing those portions but nor others. The logic may then compare the shape established by the perimeter to the first and second predetermined shapes to identify which of the two the shape established by the perimeter resembles.

Responsive to determining at diamond 804 that the area contacted by the user establishes a shape that more resembles a first predetermined shape (e.g., a first reference shape accessible to the present device), the logic proceeds to block 806 where the logic concludes that at least two body parts are or will be used to select keys of a keyboard, and then moves to block 808 where the logic performs a subsequent text alteration based on the user using two body parts to select keys of the keyboard. Responsive to determining at diamond 804 that the area contacted by the user establishes a shape that more resembles a second predetermined shape (e.g., a second reference shape accessible to the present device), the logic instead proceeds to block 810 where the logic concludes that one body part is or will be used to select keys of a keyboard, and then moves to block 812 where the logic performs a subsequent text alteration based on the user using one body part to select keys of the keyboard.

As a brief example, an affirmative determination at diamond 804 may be made where a user holds the present device with only one hand and uses only one finger to select the keys, and hence when reaching for a key not as proximate to the majority of the user's hand as another key, the user's contact area with the display may be more oval-shaped or oblong than a more-circular shape that would result from a relatively smaller or more precise finger touch that would occur if the finger were approaching and contacting the display from an angle more orthogonal to a plane established by the display (as may be the case if the user were using two hands to type).

Figure 9:
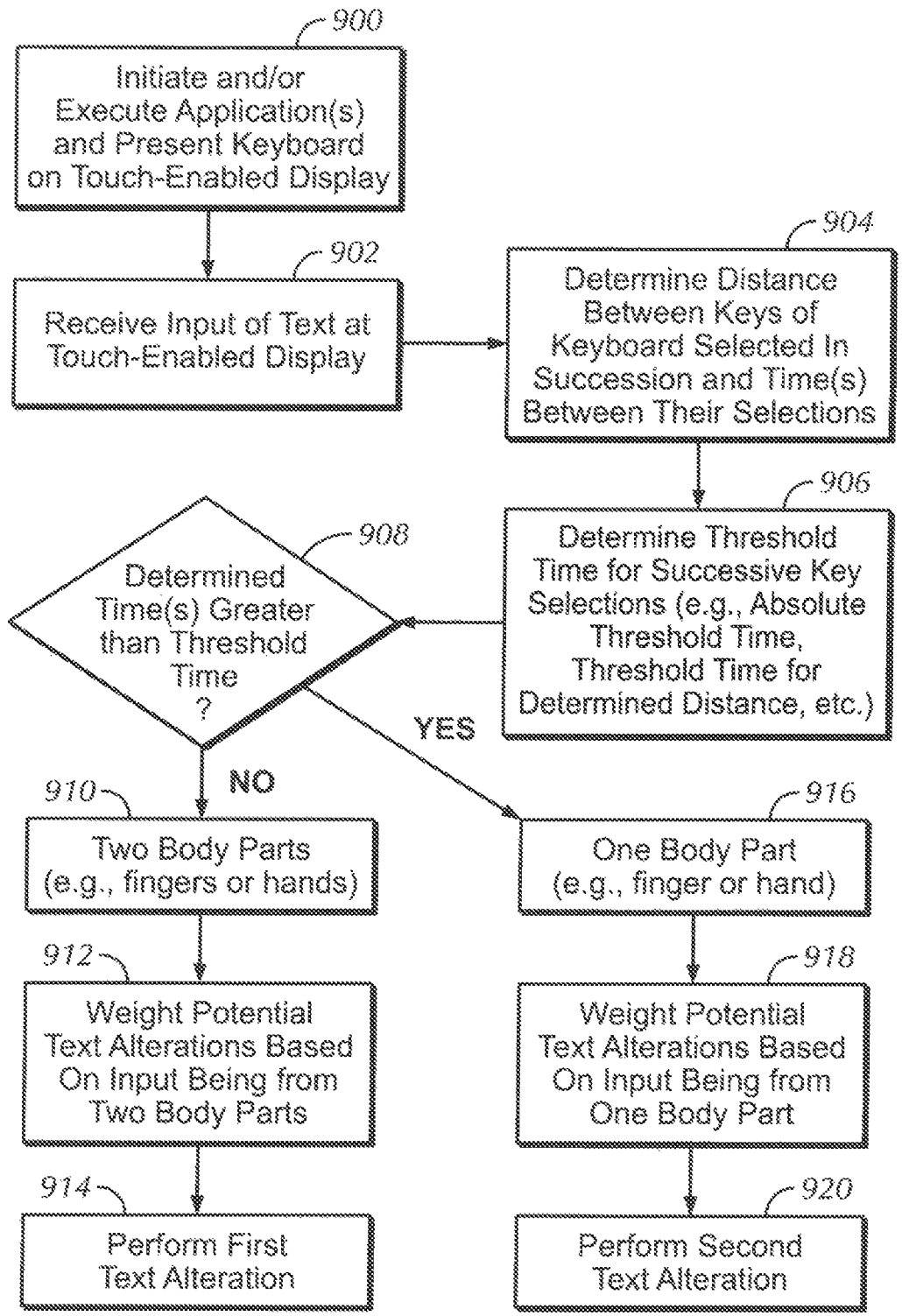

Continuing now in reference to FIG. 9, it shows another example of logic that may be executed by a device such as the system 100 in accordance with present principles (referred to below when describing FIG. 9 as the "present device") to determine whether a user is using one or two body parts to provide typing input to the present device and hence whether to perform various text alterations and/or corrections based on that. Beginning at block 900, the logic initiates and/or executes one or more applications for undertaking present principles, such as a text messaging application, an email application, a touch input processing application, etc. From block 900 the logic then proceeds to block 902 where the logic receives touch input from the user directed to a key of a keyboard presented on the present device's display. From block 902 the logic next proceeds to decision diamond 904.

At diamond 904 the logic determines a distance between keys of the keyboard that were selected in succession as identified based on the input received at block 902, which may be done for example, by identifying the size of the keys as presented on the display and the relative distance between the two along a plane established by the display. Also at block 904, the logic may determine the time(s) between selection of keys using, e.g., timer or clock software.

From block 904 the logic next proceeds to block 906 where the logic determines or identities a threshold time for successive key selections, such as by accessing a storage area at which data specifying the threshold time is stored and identifying the data therein that pertains to the threshold time. Note that in some embodiments the threshold time may be "absolute" in that it may be the same regardless of a distance between keys selected in succession, while in other embodiments the threshold time may vary based on the distance. For example, a data table may be accessed by the present device that correlates various distances (or distance ranges) between keys respectively with threshold times to be employed when the corresponding distance is determined so that the present device may identify a threshold time to use based on a determined distance using such a data table.

In any case, from block 906 the logic moves to decision diamond 908. At diamond 908 the logic determines whether the time determined at block 904 is greater than the threshold time determined at block 906. Responsive to a negative determination at diamond 908, the logic proceeds to block 910 where the logic concludes that at least two body parts are or will be used to select keys of a keyboard, and then the logic may move to block 912 where the logic may weight potential text alterations for text corresponding to the input received at block 902 and/or for text corresponding to input received subsequent to that (e.g., subsequent to the determinations at blocks 904 and 906 or the determination at diamond 908) based on the user using two body parts to select keys of the keyboard. For example, based on determining that the user is using two hands, text alterations that would correct an error in sequence of keys actually selected by a user (e.g., by changing the sequence of the selected characters) may be weighted higher than text alterations that would replace a selected character with an unselected character identified for replacement by the present device, and hence selected for replacement by the present device before lesser-weighted potential alterations are selected, and/or presented on a display for selection by a user before lesser-weighted potential alterations are presented. Note that in addition to the foregoing, these potential alterations may also be weighted based on likelihood of being intended by the user based on a history of previous text alterations made by a user and/or based on a likelihood of being intended based on a context of the text being composed. Regardless, also note that once one or more potential text alterations have been weighted, the logic may proceed to block 914 where the logic performs a text alteration based on the user using two body parts to select keys of the keyboard and/or based on the weighting done at block 912.

Referring back to diamond 908, it is to be understood that responsive to an affirmative determination thereat rather than a negative one, the logic proceeds to block 910 where the logic concludes that one body part is or will be used to select keys of a keyboard, and then the logic may move to block 918 where the logic may weight potential text alterations for text corresponding to the input received at block 902 and/or for text corresponding to input received subsequent to that (e.g., subsequent to the determinations at blocks 904 and 906 or the determination at diamond 908) based on the user using one body part to select keys of the keyboard. For example, based on determining that the user is using one hand, text alterations that would replace a selected character with another character that was not selected may be weighted higher than text alterations that would correct an error in sequence of keys actually selected by a user (e.g., by changing the sequence, of the selected characters) and hence selected for replacement by the present device before lesser-weighted potential alterations are selected, and/or presented on a display for selection by a user before lesser-weighted potential alterations are presented. Note that in addition to the foregoing, these potential alterations may also be weighted based on likelihood of being intended by the user based on a history of previous text alterations made by a user and/or based on a likelihood of being intended based on a context of the text being composed. Regardless, also note that once one or more potential text alterations have been weighted, the logic may proceed to block 920 where the logic performs a text alteration based on the user using one body part to select keys of the keyboard and/or based on the weighting done at block 918.

As a brief example, a negative determination at diamond 908 may be made where a user holds the present device with two hands and types relatively faster with both thumbs than if he or she were using one thumb to type, and hence may be more inclined to select intended keys out of sequence owing to the fast typing than if the user were merely using a single finger to select keys of the keyboard. If the user were using one finger, which may result in an affirmative determination being made at diamond 908, an error in key selection may be determined to be more likely than an error in sequence of selection. Accordingly, the logic of FIG. 9 provides an example of how a device may identity an appropriate text alteration based on this.

Figure 10:
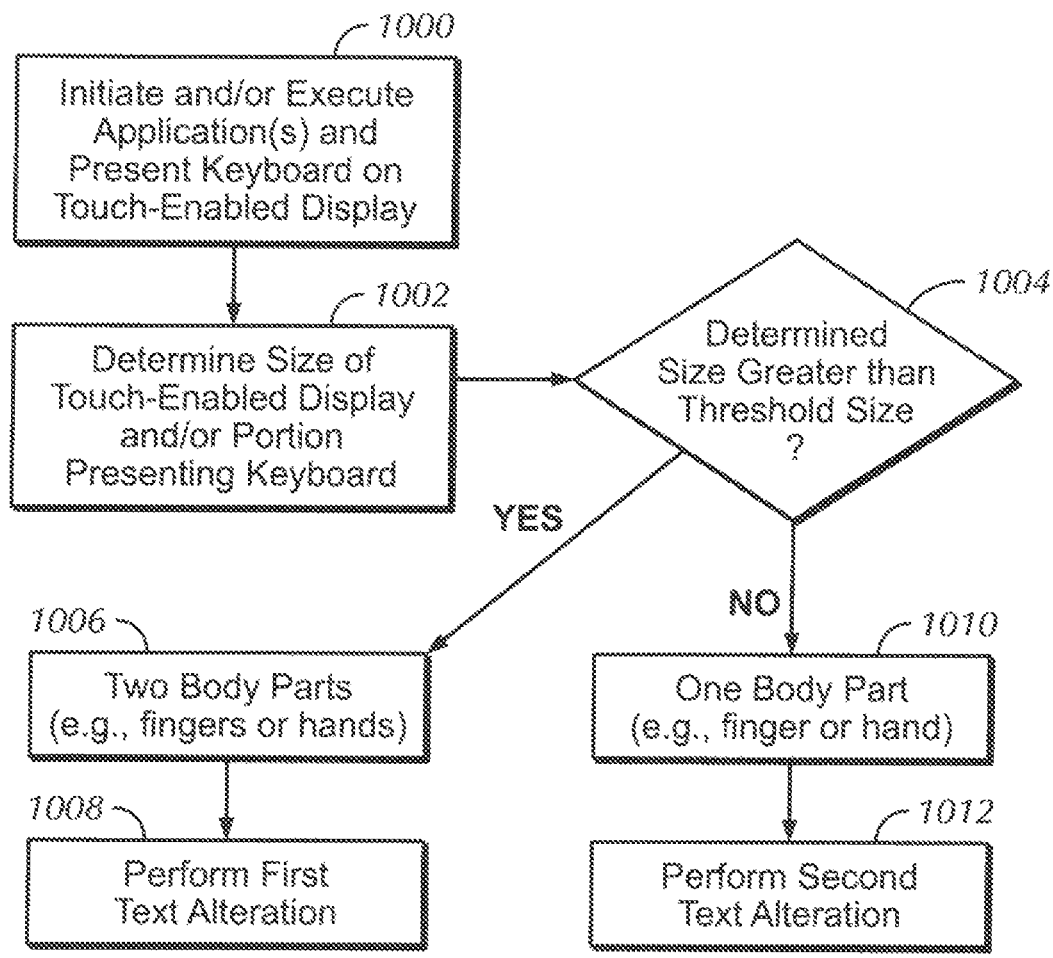

FIG. 10 will now be described. It shows example logic that may be executed by a device such as the system 100 in accordance with present principles (referred to below when describing FIG. 10 as the "present device") to determine whether a user is using one or two body parts to provide typing input to the present device and hence whether to perform various text alterations and/or corrections based on that. Beginning at block 1000, the logic initiates and/or executes one or more applications for undertaking present principles, such as a text messaging application, an email application, a touch input processing application, etc. From block 1000 the logic then proceeds to block 1002 where the logic determines a size of a touch-enabled display of the present device on which a keyboard is or will be presented, and/or the size (e.g., area) of the display specifically on which the keyboard is or will be presented. The logic may determine the size of the display by accessing data indicating the size that is stored at the present device, for instance. The logic may determine the size of the keyboard by identifying a percentage of the total area of the display (e.g., along a plane established by an exterior surface of the display) on which the keyboard is or will be presented and then multiplying the total area of the display by that percentage, and/or by identifying X and Y coordinates upper, lower, left and right bounds of the keyboard to derive the area of the display on which the keyboard is presented therefrom. Regardless, from block 1002 the logic next proceeds to decision diamond 1004.

At diamond 1004 the logic determines whether the determined size of the display or keyboard is greater than a threshold size respectively for the display or keyboard. The threshold size, either for the total area of the display or only the area on which the keyboard is presented, may be stored at the present device and hence accessed at a storage area of the present device to identify it for the determination at diamond 1004. Responsive to determining at diamond 1004 that the determined, actual size/area is more than the threshold, the logic proceeds to block 1006 where the logic concludes that at least two body parts are or will be used to select keys of a keyboard, and then moves to block 1008 where the logic performs a subsequent text alteration based on the user using two body parts to select keys of the keyboard. However, responsive to determining at diamond 1004 that the determined actual size/area is not above the threshold, the logic instead proceeds to block 1010 where the logic concludes that one body part is or will be used to select keys of a keyboard, and then moves to block 1012 where the logic performs a subsequent text alteration based on the user using one body part to select keys of the keyboard.

Figure 11:
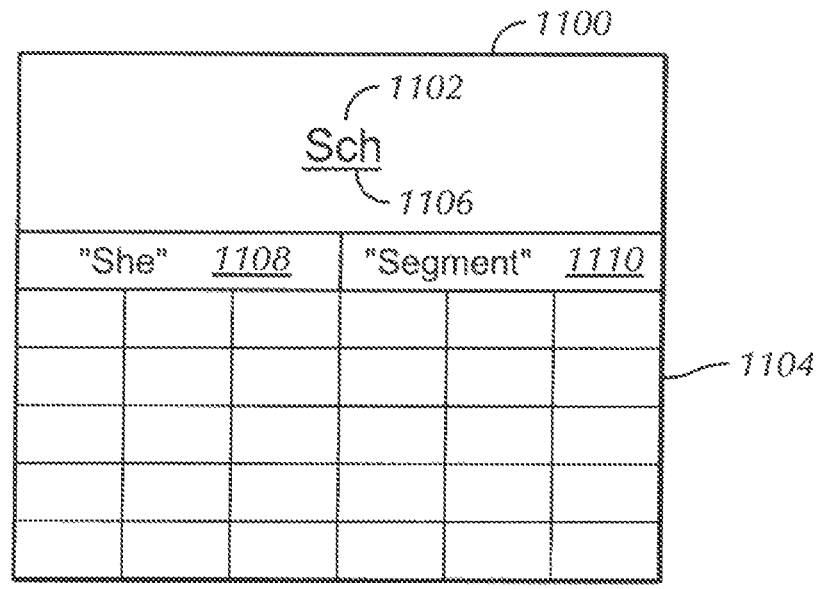
FIGS. 11-13 are example user interfaces (UIs) in accordance with present principles.

Before describing FIG. 11, it is to be understood that in some embodiments, the actual size of the display and/or keyboard need not be compared to a threshold size, but instead may be directly correlated to use of one body part or plural body parts. For instance, the logic may determine the actual size of the display or keyboard and then access a data table correlating various sizes with data pertaining to use of one or plural body parts. A device may thus access such a table, locate an entry for a size that matches an actual size of the display or keyboard as determined by the device, and then identify corresponding data in the data table pertaining to whether the user would be using one body part or plural body parts given the actual size of the display or keyboard.

Even further, it is to be understood that in some embodiments, a particular keyboard or type of keyboard may be correlated use of one body part or plural body parts. As an example using the particular keyboard criterion, the logic may determine that a QWERTY keyboard in landscape mode is being used and may correlate that to use of plural body parts, while the logic may also determine that a QWERTY keyboard in portrait mode is being used and may correlate that to use of one body part. As an example using the keyboard type criterion, the logic may determine that a numerical keyboard (such as a telephone keypad) is being used and may correlate that to use of one body part, while the logic may also determine that a QWERTY keyboard is being used and may correlate that to use of plural body parts.

Also before describing FIG. 11, it is to be understood that the various factors, metrics, determinations, etc. discussed above in reference to FIGS. 3-10 for determining whether one or plural body parts are being used to select keys of a keyboard may be combined, weighted, and/or jointly used in various embodiments for such determinations.

Now in reference to FIG. 11, it shows an example user interface (UI) 1100 presentable on a touch-enabled display accessible to a device undertaking present principles. The UI 1100 includes an indication 1102 of text selected by a user by selecting keys of a "soft" or "virtual" keyboard 1104 presented on the touch-enabled display. Note that the selected text "seh" is accompanied by an indication 1106 that a typo or misspelling has occurred. Thus, the UI 1100 also includes one or more touch-selectable options 1108, 1110 which it selected alter the text 1102 by replacing it or altering it to recite "she" (should option 1108 be selected) or to recite "segment" (should option 1110 be selected).

It may be appreciated based on the foregoing that should option 1108 be selected, the device may determine that an error in sequence of selection of intended keys occurred and hence the user is using two body parts to type. Should option 1110 be selected, the device may determine that an error in selection an intended key for a particular position in a sequence has occurred—in this case "h" was actually selected for the third position in the sequence when "g" as intended to be selected—and hence the user is using one body part to type.

Figure 12:
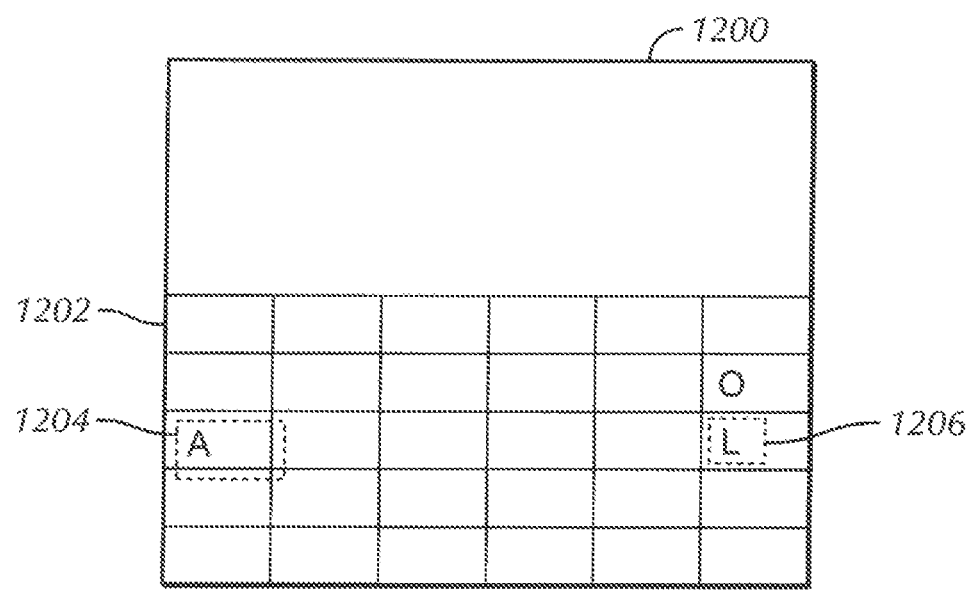

Moving on to the description of FIG. 12, it shows another UI 1200 presentable on a display of a device undertaking present principles. The UI 1200 includes a keyboard 1202 comprising plural keys that are respectively selectable based on touch input directed to an area of the display on which each particular, respective key is presented. As may be appreciated from FIG. 12, perimeter 1204 is understood to illustrate an area of the display/UI 1200 contacted by a user to select the key, while perimeter 1206 is understood to illustrate an area of the display/UI 1200 contacted by a user to select the "L" key. Note that perimeter 1206 has a more oval-like shape and outlines a greater area than the more circular shaped perimeter 1206. Thus, by identifying these characteristics as illustrated by the perimeters 1204 and 1206, the logic may determine that one body part is being used to select keys of the keyboard, and hence the "L" key that is more proximate to a user's hand receives a more precise touch then when the user has to reach for the "A" key (e.g., assuming the user is holding the device with their right hand and selecting keys with their right thumb).

Notwithstanding the foregoing, it is to be understood that in some embodiments, different characteristics of input such as those set forth above in reference to FIG. 12 may in some embodiments be determined by a device to be indicative of two body parts being used. For instance, if the "O" key of the keyboard 1202 were selected with a touch having a perimeter similar to the perimeter 1204 while the "L" key was still selected with a touch having a perimeter similar to the perimeter 1206, the logic may determine that two body parts are being used since the two inputs have different characteristics despite the selected keys being adjacent on the keyboard, and hence different contact areas from different fingers are likely being used.

Figure 13:
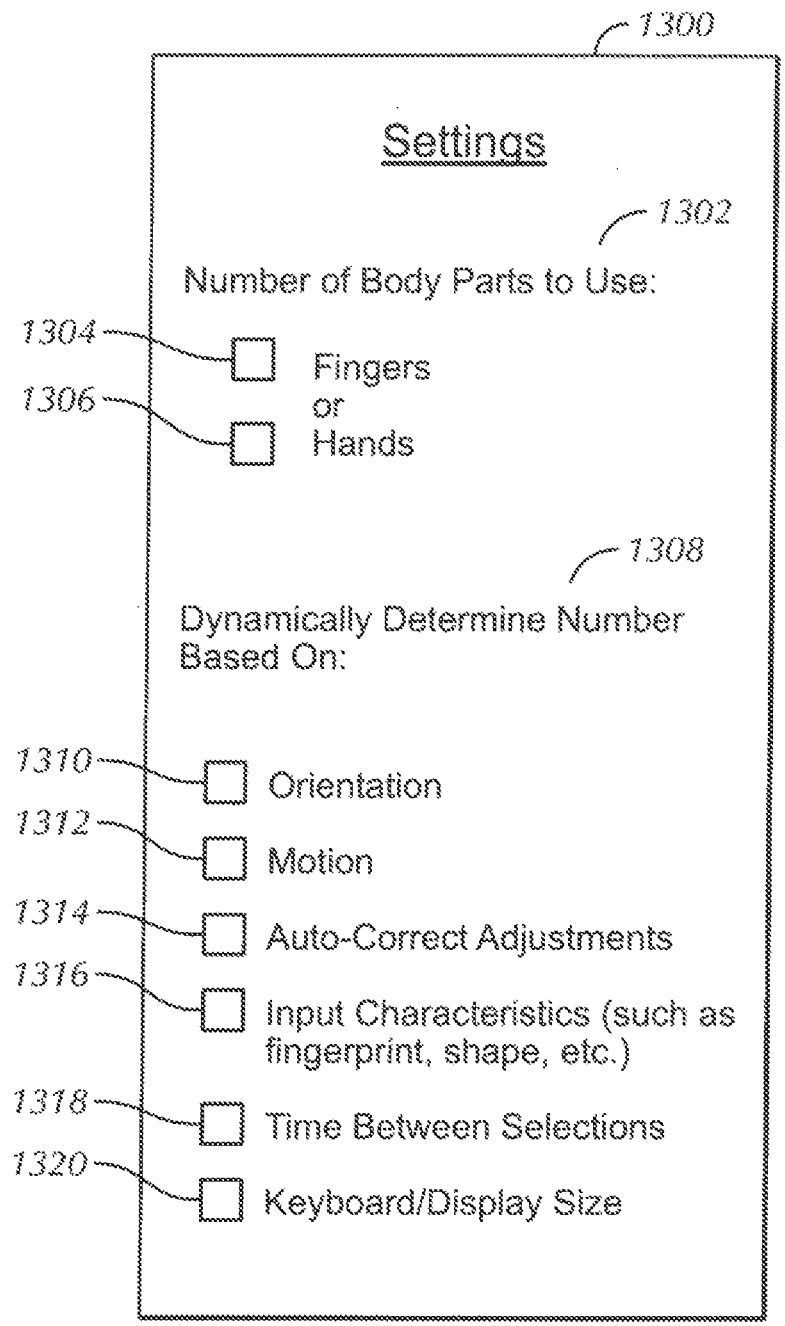

Continuing the detailed description in reference to FIG. 13, it shows yet another UI 1300 presentable on a display of a device undertaking present principles, this one for configuring settings of the present device. A first setting 1302 is shown at which a user may indicates number of body parts he or she intends to use to select keys of a keyboard by entering a number (e.g., one or two) into box 1304 to indicate a number of fingers intended to be used and/or entering a number into box 1306 to indicate a number of hands intended to be used.

The UI 1300 also includes a setting 1308 at which a user may select one or more ways for the device to dynamically determine a number of body parts being used to select keys of a keyboard, such as based on device orientation (selectable using check box 1310), based on device motion (selectable using check box 1312), based on user correction of device-initiated automatic corrections to text (selectable using check box 1314), based on characteristics of user input selecting keys of the keyboard (selectable using check box 1316) such as different fingerprints being detected and hence different fingers determined to be used and/or different shapes of the input itself, based on time between selection of two keys (selectable using check box 1318), and based on the size of the device's display and/or the size of the area of the display on which the keyboard is presented (selectable using check box 1320).

Before concluding, it is to be generally understood that present principles may be applied in situations not only involving QWERTY English keyboards, but also keyboards for other languages, Dvorak keyboards, phonetic keyboards, etc. Present principles may also be applied in situations where eye input is used to select various keys of a keyboard, and hence eyes may be a "body part" in accordance with present principles.

Also before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

While the particular TEXT ALTERATIONS BASED ON BODY PART(S) USED TO PROVIDE INPUT is herein shown and described in detail, it is to be understood that the subject matter which is encompassed by the present application is limited only by the claims.

What is claimed is:

1. A device, comprising:
   at least one processor;
   a touch-enabled display accessible to the at least one processor; and
   storage accessible to the at least one processor and bearing instructions executable by the at least one processor to:
   determine a number of body parts with which a user provides input to the device, wherein the number of body parts is determined based at least in part on receipt of user input that indicates a first text alteration to be performed, the first text alteration pertaining to changing text that is already presented on the touch-enabled display, the first text alteration not being only deletion of text; and perform a second text alteration based at least in part on the determination of the number of body parts.

2. The device of claim 1, wherein the number of body parts is at least one of: a number of hands, a number of fingers.

3. The device of claim 1, wherein the number of body parts is determined based at least in part on a determination of distance between two keys of a keyboard presented on the touch-enabled display that are selected in succession.

4. The device of claim 3, wherein the number of body parts is determined based at least in part on a time between selection of the two keys.

5. The device of claim 1, wherein the number of body parts is determined based at least in part on a time between selection of two keys of a keyboard presented on the touch-enabled display.

6. The device of claim 5, wherein the time is a first time, wherein the first time is compared to a threshold time, and wherein the number of body parts is determined based at least in part on the comparison.

7. The device of claim 1, wherein the number of body parts is determined based at least in part on identification of one or more of a size of the touch-enabled display and a size of a keyboard presented on the touch-enabled display.

8. The device of claim 1, wherein the number of body parts is determined based at least in part on identification of a keyboard that is presented.

9. The device of claim 1, wherein the number of body parts is determined based at least in part on a shape of an area of the touch-enabled display touched by the user in at least a first instance.

10. The device of claim 1, wherein the number of body parts is determined based at least in part on a size of an area of the touch-enabled display touched by the user in at least a first instance.

11. The device of claim 1, wherein the number of body parts is determined based at least in part on a determination that the touch-enabled display is currently presenting content in one of: a portrait orientation, a landscape orientation.

12. The device of claim 1, wherein the number of body parts is determined based at least in part on user input indicating a number of body parts.

13. The device of claim 12, wherein the user input indicating the number of body parts is received at a user interface (UI) presented on the touch-enabled display at which settings related to input of text are configurable.

14. A method, comprising:

determining one or more body parts with which a user touches a display, wherein the one or more body parts are determined based at least in part on receipt of user input that indicates a first text correction to be executed, the first text correction pertaining to changing text that is already presented on the display, the first text alteration not being only deletion of text; and executing a second text correction based at least in part on the determination.

15. The method of claim 14, wherein the method comprises:

weighting plural possible text corrections based at least in part on the determination.

16. The method of claim 14, wherein one or more body parts are determined based at least in part on user input indicating a number of body parts.

17. The method of claim 14, wherein the one or more body parts are determined based at least in part on identification of the display as presenting content in one of: a portrait orientation, a landscape orientation.

18. An apparatus, comprising:

a first processor;

a network adapter; and storage bearing instructions executable by a second processor for:

determining a typing style with which a user provides input to a touch-enabled display accessible to the second processor, wherein the typing style is determined based at least in part on user input that indicates a first text alteration that the second processor is to perform, the first text alteration pertaining to an alteration of text that is presented on the touch-enabled display, the first text alteration not being only deletion of text; and performing a second text alteration based at least in part on the determination of the typing style;

wherein the first processor transfers the instructions to the second processor over a network via the network adapter.

19. The apparatus of claim 18, wherein the typing style is determined based at least in part on user input indicating the typing style.

20. The apparatus of claim 18, wherein the instructions are executable by the second processor for:

determining the typing style with which the user provides input to the touch-enabled display based at least in part on a determination that the touch-enabled display is currently presenting content in one of: a portrait orientation, a landscape orientation.

* * * * *